United States Patent
Bender et al.

(10) Patent No.: US 6,535,918 B1
(45) Date of Patent: *Mar. 18, 2003

(54) INTERFACE BETWEEN STANDARD TERMINAL EQUIPMENT UNIT AND HIGH SPEED WIRELESS LINK

(75) Inventors: Paul E. Bender, San Diego, CA (US); Matthew S. Grob, La Jolla, CA (US); Robert H. Kimball, San Diego, CA (US)

(73) Assignee: Qualcomm Incorporated, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,046

(22) Filed: Sep. 22, 1998

(51) Int. Cl.[7] ................................. G06F 15/16
(52) U.S. Cl. ................. 709/228; 709/249; 709/250
(58) Field of Search .................. 709/227, 229, 709/249, 250, 230, 237, 238, 200, 228; 370/310, 312, 313; 340/825.07, 825.52

(56) References Cited

U.S. PATENT DOCUMENTS

| | | | | |
|---|---|---|---|---|
| 5,159,592 A | * | 10/1992 | Perkins | 370/401 |
| 5,708,655 A | * | 1/1998 | Toth et al. | 370/313 |
| 5,862,345 A | * | 1/1999 | Okanoue et al. | 709/238 |
| 5,889,816 A | * | 3/1999 | Agrawal et al. | 375/220 |
| 6,028,848 A | * | 2/2000 | Bhatia et al. | 709/249 |
| 6,041,358 A | * | 3/2000 | Huang et al. | 709/238 |
| 6,052,725 A | * | 4/2000 | McCann et al. | 709/227 |
| 6,058,106 A | * | 5/2000 | Cudak et al. | 370/313 |
| 6,058,421 A | * | 5/2000 | Fijolek et al. | 370/312 |
| 6,061,346 A | * | 5/2000 | Nordman | 370/352 |
| 6,070,187 A | * | 5/2000 | Subramaniam et al. | 709/249 |
| 6,073,178 A | * | 6/2000 | Wong et al. | 709/229 |
| 6,151,628 A | * | 11/2000 | Xu et al. | 709/225 |
| 6,178,455 B1 | * | 1/2001 | Schutte et al. | 709/228 |
| 6,272,148 B1 | * | 8/2001 | Takagi et al. | 370/469 |
| 6,330,244 B1 | * | 12/2001 | Swartz et al. | 370/401 |

OTHER PUBLICATIONS

Olshansky et al.; "Residential LAN architecture"; 2nd International Workshop on Community Networking; ISBN: 0-7803-2756-X; pp. 55-60, Jun. 1995.*

Wada et al.; "Mobile computing on wireless telecommunication networks"; 5th IEEE International Conference on Universal Personal Communications; ISBN:0-7803-3300-4; pp. 778-782, vol. 2, Oct. 1996.*

"The IP Modem Interface Standard", Portable Computer & Comm. Assoc. Modem Standards Committee, May 6, 1998, pp. 1-26.

"Extending the IP Internet Through Address Reuse", Tsuchiya et al., Computer Communication Review, pp. 16-33.

"Performance Study of WaveLAN and Altair Radio—LANs" Hollemans, et al. IEEE, pp. 831-837.

RFC2002 "IP Mobility Support" C. Perkins, Editor pp. 1-79 (Oct., 1996).

* cited by examiner

Primary Examiner—Mark H. Rinehart
Assistant Examiner—Marc D. Thompson
(74) Attorney, Agent, or Firm—Philip R. Wadsworth; Kent D. Baker; Thomas R. Rouse (57) ABSTRACT

A system provides wireless data service. The system includes a wireless modem configured to be coupled to a terminal equipment unit over a wireline broadcast medium. A network unit is coupled to the wireless modem over a wireless link connection. A network remote server is coupled to the network unit. The network remote server provides IP address information in response to terminal equipment unit address request messages for terminal equipment units coupled to the network unit. In addition, a local server is coupled to the wireless modem. The local server provides IP address information in response to terminal equipment unit address request messages from terminal equipment units coupled to the wireline broadcast medium.

30 Claims, 3 Drawing Sheets

INTERFACE BETWEEN STANDARD TERMINAL EQUIPMENT UNIT AND HIGH SPEED WIRELESS LINK

BACKGROUND OF THE INVENTION

I. Field of the Invention

The invention relates to wireless communication systems. More particularly, the invention relates to techniques of interfacing data terminal equipment units to wireless data networks.

II. Description of the Related Art

Large networks for interconnecting computers have been readily available and yet constantly evolving since the mid-1980's. The largest and most commonly known digital data network is the Internet. In general, networks provide for the communication of digital data between two data terminals. In addition to the Internet, many organizations have private networks to which access is limited to a select number of users. For example, a corporation may have an internal data network which interconnects its computers, servers, dumb terminals, printers, inventories and test equipment using a wired Ethernet topology.

Typical networks operate based on the transfer of groups of bits, called frames. Thus, an entire file of data, such as an e-mail message, is segmented into a series of frames for transmission over the network. The actual data represented in each frame is attached to a series of headers associated with a set of protocol layers. Each protocol layer is devoted to handling one or more of the issues involved with the transportation of data between terminals.

Most digital networks are comprised of many nodes. On its journey through the network a frame may pass through a series of network nodes. The nodes may be repeaters, bridges, routers, switches or gateways depending, generally, on the highest protocol layer which is examined by the node and whether the node transforms the data from one transport protocol to another.

The nodes maybe connected using a variety of different physical media, referred to as links. With the advent of wireless communication techniques, some data networks now include nodes which are connected by a wireless medium. Through the use of such a system, rather than being tethered to a wired connection to a physical data port the user may transport his terminal to a remote location and still have access to the network.

Figure 1:
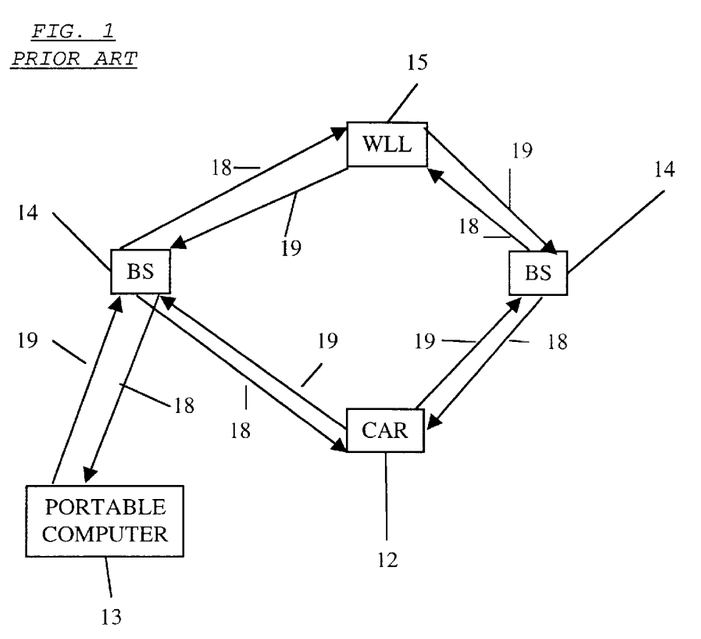
FIG. 1 is an exemplary embodiment of a terrestrial wireless communication system in which mobile data and voice service is provided.

FIG. 1 is an exemplary embodiment of a terrestrial wireless communication system 10. FIG. 1 shows three remote units 12, 13, and 15 and two base stations 14. In reality wireless communication systems may have many more remote units and base stations. In FIG. 1, the remote unit 12 is shown as a mobile telephone unit installed in a car. FIG. 1 also shows the fixed location remote unit 15 in a wireless local loop system and the portable computer remote unit 13 in a standard cellular system. In the most general embodiment, the remote units maybe any type of communication unit For example, the remote units may be hand-held personal communication system (PCS) units, portable data units such as a personal data assistant, or fixed location data units such as meter reading equipment. FIG. 1 shows a forward link 18 from the base stations 14 to the remote units 12, 13 and 15 and reverse link 19 from the remote units 12, 13 and 15 to the base stations 14.

Several commercial systems exist which provide true mobility to the user for data and voice services. The system illustrated in FIG. 1 may use code division multiple access (CDMA), time division multiple access (TDMA), a combination of frequency hopping and TDMA (such as Global System for Mobile Communication (GSM)) or other modulation and access techniques. In the past standards using each of these communication techniques have been initially developed to provide voice services. The remote units using existing voice standards have been adapted to provide data services—for example, to act as nodes within a digital internetwork.

However, higher performance wireless data networks may be developed for data-only applications. Without the need for constraints imposed by voice operation, a data-only network can be designed which provides much higher rates than that achievable by the adaptation of the wireless voice systems.

Figure 2:
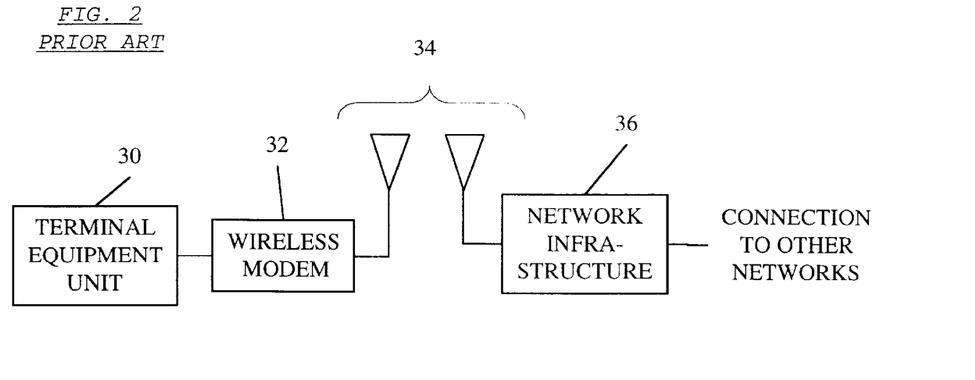
FIG. 2 is a block diagram illustrating a prior art system which provides wireless digital communication for a terminal equipment unit.

FIG. 2 illustrates a prior art system which provides wireless digital communication for terminal equipment unit 30. Generally, the terminal equipment unit 30 may be any type of terminal which produces digital information. For example, the terminal equipment unit 30 may be a personal notebook computer, a printer, test equipment, a server, a dumb terminal or a variety of other equipment. Digital data produced by the terminal equipment unit 30 is passed to a wireless modem 32 via a standard digital link. For example, the terminal equipment unit 30 maybe connected to the wireless modem 32 via a bi-directional RS-232 bus. The wireless modem 32 provides an interface to a wireless link 34 and network infrastructure 36. When communications are estblished between the terminal equipment unit 30 and other equipment connected to the network infrastructure 36, the wireless modem 32 and the terminal equipment unit 30 exchange digital data over the RS-232 bus. The RS-232 bus is an industry standard serial link physical layer over which data formatted in a variety of higher layer protocols may pass.

As noted above, with the advent of data-only wireless networks, the speed at which data may travel across the wireless link has increased significantly. In fact, today the data rate which maybe achieved over the wireless link exceeds the maximum data rate which may pass over an RS-232 link. In order to reap the benefits of increased data speeds over the wireless link the wireless modem must exchange data with the terminal equipment unit at a rate which is similar to the highest data rate available over the wireless link. Thus, it becomes apparent that the RS-232 link, as used in prior art configurations, becomes a limiting factor which prevents the terminal equipment unit 30 from taking advantage of the increased data rates available on the wireless link 34.

One important criterion when designing a wireless modem is that the interface with the terminal equipment unit be in accordance with an accepted industry standard. Aside from RS-232, another such industry standard is Ethernet. Ethernet was developed for wired applications and is not particularly suited for a wireless environment. For example, Ethernet is a broadcast system. In other words, all stations on an Ethernet network receive all messages regardless of whether the station represents the intended destination. Each station must examine the received frames to determine if the station is the destination. If the station is the intended destination, the frame is passed to a higher protocol layer for appropriate processing at the station. If the current station is not the proper destination, the station simply discards the frame.

Each station in an Ethernet system is assigned a hardware address. The hardware address is contained on the Ethernet interface card and is permanent and unique to the Ethernet interface card hardware. Groups of Ethernet stations which time multiplex their signaling on a common Ethernet connection are called a subnet. When a station on an Ethernet subnet sends a message to a station outside of its Ethernet subnet, it sends it to a gateway associated with the Ethernet subnet. Each Ethernet frame begins with a preamble. Following the preamble, the frame comprises the hardware address of the destination station and the hardware address of the source station. Within the Ethernet frame, the source address is always a unicast address meaning that the source always indicates the address of the terminal equipment unit which is sending the message. The destination address maybe unicast (to single node), multicast (to group of nodes), or broadcast (to all nodes on the Ethernet subnet) address.

Because of the finite availability of spectral resources, the capacity of the wireless link is a very precious resource. Broadcasting a single message to a large number of stations consumes significant resources. For this reason, it is not practical to operate a wireless link using Ethernet-type broadcast messaging.

However, as stated above, it is important to use standard terminal equipment unit interface mechanisms when introducing a wireless link into a digital data network. Therefore, a need exists in the industry to provide an interface between standard terminal equipment units and a high speed wireless link.

SUMMARY OF THE INVENTION

A wireless modern is used to connect a wireline broadcast medium terminal equipment unit such as an Ethernet unit to a network unit over a wireless link. In order to avoid the transmission of broadcast messages from the network unit over the wireless link, a local server is incorporated within the wireless modem. When the terminal equipment unit sends a request for an address to the network unit the wireless modem intercepts the message. The local server assigns an IP address to the terminal equipment unit and responds to the terminal equipment unit In this way, the terminal equipment unit need not be modified in any way.

The wireless modem receives packets from the terminal equipment unit over the wireline broadcast medium from the terminal equipment unit and forwards it over the wireless link to the network unit using a conventional wireless protocol. In addition, the wireless modem routes packets received over the wireless link addressed to the terminal equipment unit to the wireline broadcast medium.

BRIEF DESCRIPTION OF THE DRAWINGS

The features, objectives, and advantages of the invention will become more apparent from the detailed description set forth below when taken in conjunction with the drawings.

DETAILED DESCRIPTION OF THE PREFERRED EMBODIMENT

Figure 3A:
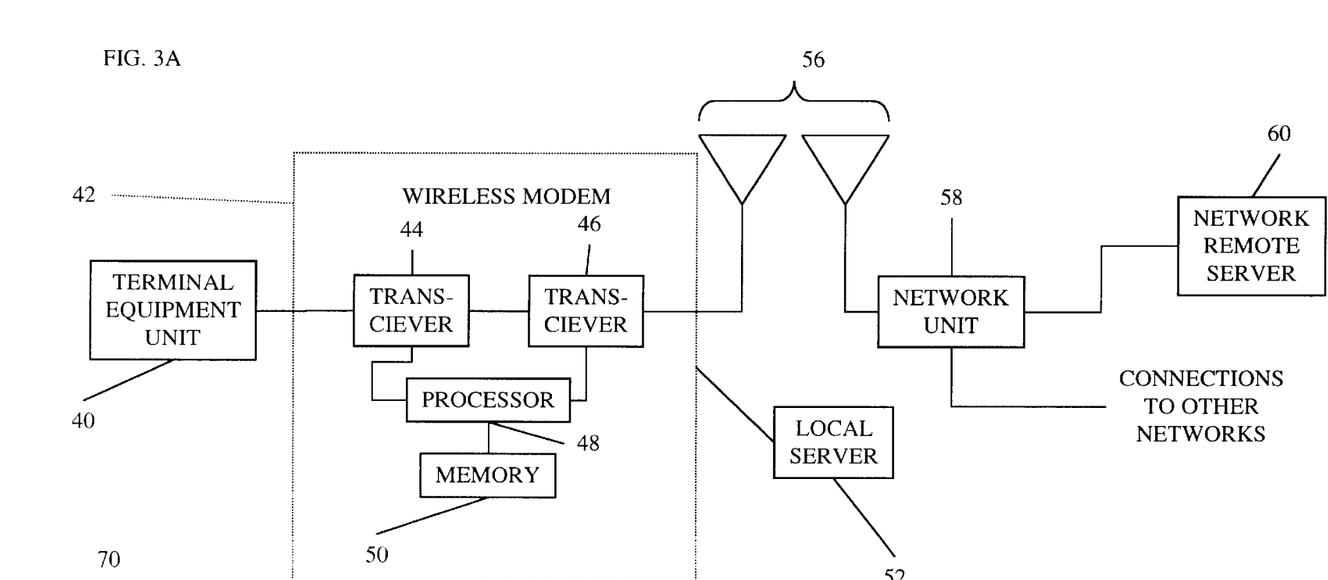
FIGS. 3A, 3B and 3C are a block diagram and two corresponding protocol layer diagrams showing a data system comprising a wireless link.

FIG. 3A is a block diagram showing a data system comprising a wireless link 56. A standard terminal equipment unit 40 is connected to a wireless modem 42 via an Ethernet connection. Ethernet defines a wired physical layer and a link layer protocol used to connect two or more terminal equipment units. The physical layer defines the electrical, mechanical, procedural and functional specifications for activating maintaining and deactivating the physical link between two or more stations on the network. Such characteristics as voltage levels, timing of voltage level transitions, physical data rates, maximum transmission distances, physical connector types, and other similar attributes are defined by the physical layer specification. The link layer provides reliable transmission of data across the physical link. In doing so, the link layer is concerned with the physical addressing, network topology, error notification, ordered delivery of frames and flow control.

As noted above, Ethernet operates using broadcast messages. In a broadcast system, each station in the network examines each data frame to determine whether the frame is intended for the station. Because in a broadcast system each message maybe sent to every station on a network, a broadcast system does not provide an efficient use of wireless link resources because it may require transmission of messages to stations to which the messages are not intended.

Therefore, the wireless modem 42 in FIG. 3A acts as a gateway between an Ethernet system connecting the terminal equipment unit 40 and the wireless modem 42 and a standard Internet Protocol (IP) suite system connecting the wireless modem 42 and a network unit 58 over the wireless link 56. The IP suite maybe used to internetwork a diverse range of local area networks (LANs) and wide area networks (WANs). For example, in the last twenty years, networks have been implemented which operate according to Ethernet, Token Ring X.25, Frame Relay, Integrated Services Digital Network (ISDN), and Asynchronous Transfer Mode (ATM). The IP suite provides a means of interconnecting each of these networks with any of the others.

Within the wireless modem 42, a set of transceivers 44 and 46 facilitate communication over the Ethernet connection and the wireless link connection 56 respectively. Typically, the transceiver 44 comprises a standard Ethernet communication card. The transceiver 46 typically comprises a wireless link communication module to perform the radio link protocol and physical layer functions. A processor 48 controls the operation of the wireless modem 42. The processor 48 interfaces with the transceivers 44 and 46 as well as a memory unit 50. The memory 50 may store executable program code as well as other forms of data.

Figure 3B:
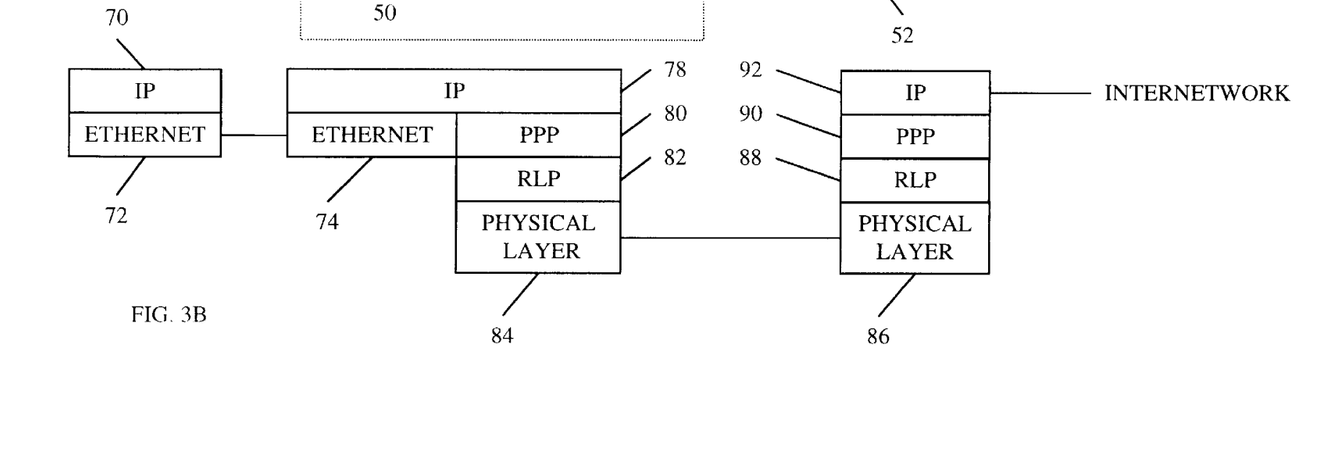

FIG. 3B is a diagram illustrating a series of protocol stacks, each stack illustrating the operation of the corresponding functional block shown above it in FIG. 3A. The protocol stacks of FIG. 3B illustrate the operation of the system when data is passing over the wireless link 56. In general, each of the stacks operates using at least a portion of the IP suite. The IP suite is the most widely implemented multi-vendor protocol suite in use today. The IP layer provides internetwork routing based upon an IP address field found in each IP frame or datagram as they are commonly called. Additional information concerning the IP suite can be found in Request For Comment (RFC) 791 entitled "Internet Protocol: DARPA Internet Program: Protocol Specification" and dated September 1981. The RFC series of documents specify Internet standards for the Internet community and request discussion and suggestion for improvements.

IP addresses are globally unique. Typically, IP addresses are 32 bit numbers assigned by a network information center, such as a dynamic host configuration protocol (DHCP) unit or a bootstrap protocol (BootP) unit. Globally unique addresses permit IP networks anywhere in the world to communicate with each other.

After the establishment of a connection between the terminal equipment unit 40 and a far end unit coupled to the network unit 58, a higher level protocol layer within the terminal equipment unit 40, such as an application layer protocol, creates data which is passed to an IP layer 70. The IP layer 70 produces IP datagrams which are passed to an Ethernet layer 72. The Ethernet layer 72 encapsulates the IP datagrams into Ethernet data packets. The IP address designated within the IP datagram is the IP address of a far end unit coupled to the network unit 58. Therefore, the Ethernet layer 72 encapsulates the IP datagram in an Ethernet frame designating the hardware address of the wireless modem 42 which acts as an Ethernet gateway. The terminal equipment unit 40 broadcasts the Ethernet message over the Ethernet link and it is received by the wireless modem 42. Within the wireless modem 42, an Ethernet layer 74 strips off the Ethernet encapsulation to retrieve the IP datagrams and passes them to an IP layer 78. The IP layer 78 passes the IP datagrams to a point-to-point protocol (PPP) layer 80. The PPP layer 80 operates according to industry standards and is generally designed for use in a variety of point-to-point connections such as serial Internet connections. The PPP layer 80 may be used for link establishment, configuration and testing the connection of two peer nodes over a bit or byte stream. The PPP layer 80 provides a method for encapsulating multi-protocol datagrams. The PPP layer 80 also provides negotiation for compression and encryption methods for a connection. Additional information concerning the PPP layer 80 may be found in RFC-1661 entitled "The Point-to-Point Protocol (PPP)" and is well-known by those skilled in the art. In addition to PPP, any protocol which frames packets through a byte stream maybe used in conjunction with the invention.

The PPP layer 80 interfaces with a radio link protocol layer (RLP) 82. The RLP layer 82 enhances the error performance of the radio link and makes it equivalent to that of a typical landline connection. The RLP layer 82 interfaces with a physical layer 84. The physical layer protocol defines the waveform, modulation, interleaving and encoding of the wireless link signal. The physical layer 84 passes frames of data over the wireless link 56. Within the network unit 58, a corresponding physical layer 86, RLP layer 88, PPP layer 90, and IP layer 92 perform the logical converse of the operations performed the wireless modem 42 to produce IP datagrams. The IP datagrams can be transferred directly over an internetwork. Likewise, when an IP datagram arrives at the network unit 58 specifying the IP address of the terminal equipment unit 40, the analogous reverse operations are performed.

Before the terminal equipment unit 40 can transmit or receive IP datagrams over the wireless link 56, the terminal equipment unit 40, as well as the wireless modem 42, must be assigned an IP address so that each may be addressed individually within the system. In addition, the use of independent IP addresses allows the terminal equipment unit 40 and the wireless modem 42 to exchange IP messages intended for one another. In FIG. 3A, the network unit 58 is associated with a network remote server 60 which, among other functions, monitors for broadcast messages from wired terminal equipment units connected to the network unit 58 according to a standard network information center protocol.

The process of assigning IP addresses to stations on a network is a part of network management. Network management refers to the network's ability to manipulate its own resources from a central location using the network itself as a communication and configuration medium. One area of network management is network initialization. In an IP system, it is advantageous to have the network determine each station's network settings rather than having the settings fixed within the station or programmed by the human user. In this way, changing an IP address numbering scheme, for example, only requires changes on a few servers rather than manual IP address changes on each station in the network. Also, by allocating the assignment of IP addresses to the network remote server 60, the users themselves need not comprehend the process of assigning IP addresses.

In a standard wireline network operating according to the IP suite, when a terminal equipment unit is first powered on, it broadcasts a message intended for the network remote server 60. The broadcast message specifies the terminal equipment unit's permanent hardware address and the terminal equipment unit's need for an IP address. Several standard network information center protocols have been developed such as BootP or DHCP. BootP is a simple method of assigning IP addresses based on Ethernet addresses. Additional information concerning BootP may be found in RFC-951 entitled "Bootstrap Protocol (BOOTP)." DHCP is structured as an extension to BootP and can communicate additional information to the requesting unit making it a popular solution to local area network host initialization. Additional information concerning DHCP may be found in RFC-2131 entitled "Dynamic Host Configuration Protocol."

In response to the broadcast request from the terminal equipment unit the network remote server 60 broadcasts a reply message. Commonly, the reply message is broadcast because the requesting unit does not yet know its IP address and, therefore, cannot be directly addressed using the IP protocol. The reply message comprises the hardware address of the requesting unit and the IP address which is being assigned to that unit. As noted above, with the introduction of the wireless link 56 to the system shown in FIG. 3A, it is advantageous to avoid broadcasting messages in order to conserve the bandwidth and capacity of the wireless link 56.

When power is initially applied to the terminal equipment unit 40 and the wireless modem 42, each of them has a unique hardware address. The Ethernet system is set up such that the terminal equipment unit 40 and the wireless modem 42 are stations on an Ethernet subnet. In addition, the wireless modem 42 is defined as a gateway between the Ethernet subnet and an external network.

One commonly used means to initialize a connection is to use the IP address negotiation feature built into the PPP layers 80 and 90. However, the PPP layers 80 and 90 are not adapted to handle multiple IP addresses and, therefore, are not adapted to provide both the wireless modem 42 and the terminal equipment unit 40 with a separate IP address. For this reason, a new means of negotiating an IP address must be incorporated into the system of FIG. 3A which does not rely on the IP address negotiation feature provided by the PPP layers 80 and 90 and does not require broadcast messages to be transmitted over the wireless link 56.

Figure 3C:
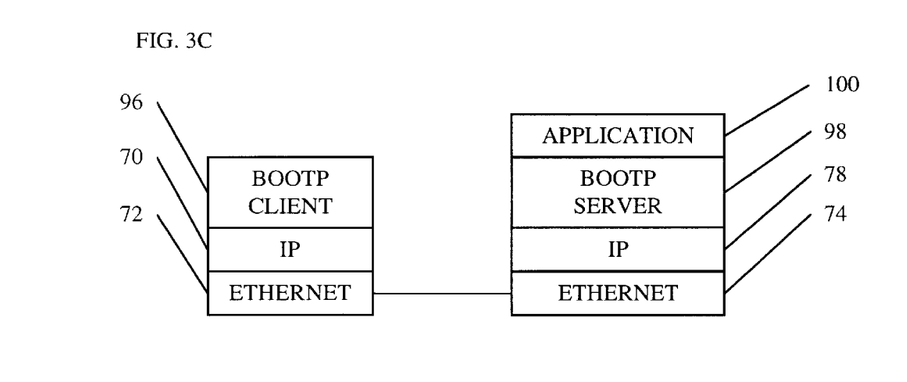

In one embodiment of the invention, the wireless modem 42 is preassigned an IP address for its own use and is supplied with an IP address for assignment to the terminal equipment unit 40. The assignable addresses are stored within a local server 52. In a typical embodiment, the local server 52 is integrated into a common structure and housing with the wireless modem 42. FIG. 3C is a series of two protocol stack diagrams, each illustrating the operation of the corresponding functional block shown above it in FIG. 3A. The protocol stacks of FIG. 3C illustrate the operation of the system when the terminal equipment unit 40 and the local server 52 are communicating using a BootP application layer. At power on, the BootP client protocol layer 96 in the terminal equipment unit 40 creates a broadcast message requesting an IP address and specifying its own hardware address and passes it to the IP layer 70. The IP layer 70 passes the request message to the Ethernet layer 72. The Ethernet layer 72 encapsulates the IP address request message into one or more broadcast Ethernet frames and broadcasts them over the Ethernet connection according to well-known procedures.

The Ethernet layer 74 in the wireless modem 42 receives the broadcast Ethernet frame. The Ethernet layer 74 extracts the IP address request message from the broadcast Ethernet frame and passes it to the IP layer 78. Rather than forward the IP address request message to the remote server 60, the IP layer 78 passes it to a BootP server application layer 98. The BootP application server layer 98 in turn passes the request message to an application 100 within the local server 52 that provides IP addresses. The local server 52 assigns one of the stored IP addresses to the terminal equipment unit 40. The application 100 creates a response message which is passed through the reverse protocol stack operation from the application 100 to the BootP client protocol layer 96. In this way, wireless link resources are not used to convey broadcast messages for IP address response messages to the terminal equipment unit 40. Accordingly, this function of the remote server 60 has been allocated to the local server 52 for purposes of the terminal equipment unit 40. Alternatively, the terminal equipment unit 40 may have a preassigned IP address at power on.

The local server 52 may obtain the IP address for the terminal equipment unit 40 in one of a variety of ways. For example, in one embodiment, the wireless modem 42 may create and send a custom IP address request message which requests one or more IP addresses from the remote server 60. The custom IP address request message originates from an application rather than the lower layer protocols and, in this way, avoids modification of such standard lower layer protocols. Addition of the custom IP address request message to the library of functions available at the wireless modem 42 is not burdensome, because the wireless modem 42 is a new entity running custom application layer software. By modifying the wireless modem 42 to retrieve one or more IP addresses for the terminal equipment unit 40, and maybe also for itself, modification of the terminal equipment unit 40 may be avoided.

In another embodiment, the local server 52 may store a set of one or more permanent IP addresses. The permanent IP addresses maybe addresses within a range defined to be unroutable by the network unit 58. In this scheme, a standard network address translation (NAT) unit in the remote server 60 translates the unroutable address to a routable address before passing the corresponding datagrams over the network.

Figure 4:
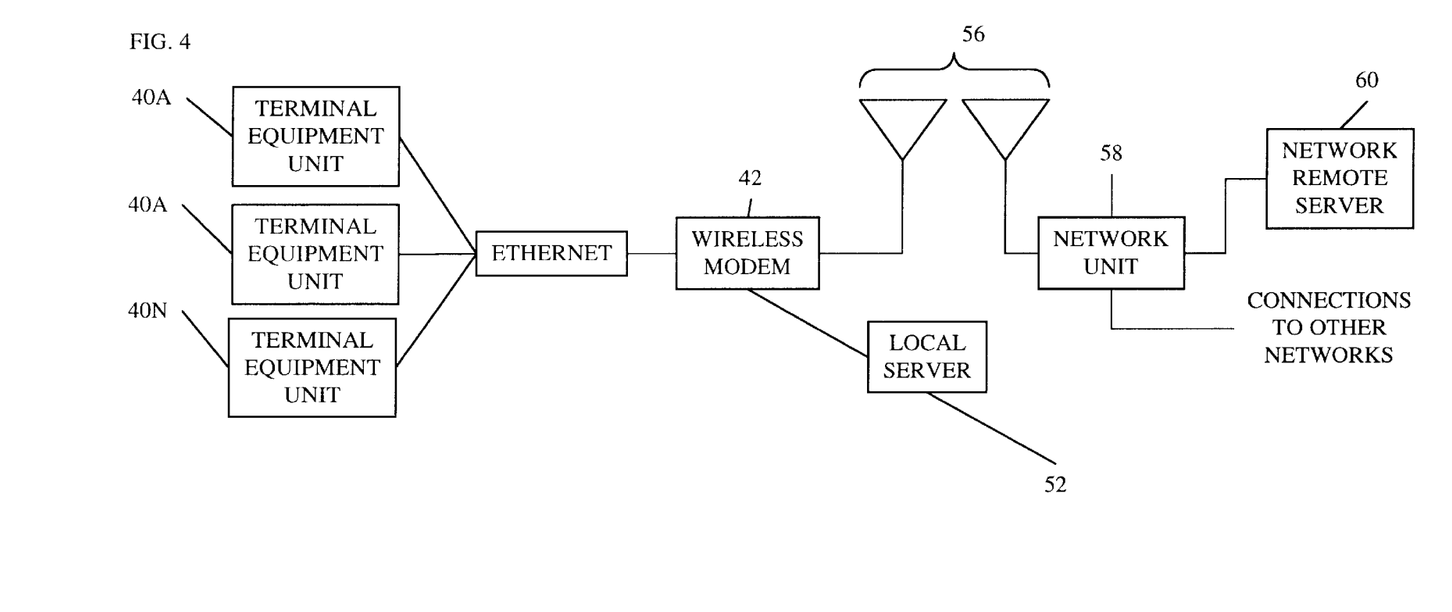
FIG. 4 is a block diagram showing a data system comprising a wireless link in which a singe wireless modem services multiple terminal equipment units.

The invention is also directly applicable to a system in which multiple terminal equipment units are connected via an Ethernet connection. FIG. 4 is a block diagram showing a data system comprising a wireless link in which a singe wireless modem services multiple terminal equipment units. Each terminal equipment unit 40A–40N operates according to the protocol stacks shown in FIGS. 3B and 3C. At power on, each terminal equipment unit 40A–40N sends an IP address request message. The wireless modem 42 intercepts each message in turn according to the protocol stack of FIG. 3C and the local server 52 responds with an IP address response message. Once the terminal equipment units 40A–40N have been assigned an IP address, each unit may communicate over the Ethernet network in turn according to the Ethernet protocol. The wireless modem 42 processes the information according to the protocol stack shown in FIG. 3B when appropriate. Also, the wireless modem 42 may receive information over the wireless link 56 and create Ethernet messages for each terminal equipment unit 40A–40N, in turn.

The invention maybe embodied in other forms without diverging from its defining characteristics. For example, in the embodiment shown above, an Ethernet connection is used to couple the wireless modem to the terminal equipment unit. In a general embodiment, the connection maybe any wireline medium which relies on broadcast messaging. Likewise, other functions besides IP address assignment may be relegated to the wireless modem in order to avoid broadcasting messages over a wireless link. In one embodiment, the wireless modem and the terminal equipment unit are housed within a common body. For example, the wireless modem may be installed within a lap top computer.

The invention may be implemented in a variety of media including software and hardware. Typical embodiments of the invention comprise computer software which executes on a standard microprocessor or an application specific integrated circuit (ASIC).

The wireless link connection may operate under one of a plurality of well-known or later developed operating protocols. For example, the wireless link may operate using time division multiple access, code division multiple access or other interface supporting a point to point connection.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An apparatus comprising:
    a wireless modem, configured to be coupled to a wireline broadcast medium and a wireless link connection, to send a message requesting an Internet Protocol (IP) address over the wireless link connection to a network remote server, to receive the IP address over the wireless link connection, and to pass an address request message; and
    a network local server, coupled to the wireless modem, configured to store the received IP address, and to provide the stored IP address in response to the address request message passed from the wireless modem.

2. The apparatus of claim 1 wherein the wireless modem is configured as a gateway to the wireline broadcast medium.

3. The apparatus of claim 2 wherein the wireless modem is further configured to:
    receive an encapsulated IP message over the wireline broadcast medium;
    extract the encapsulated IP message; and
    forward a corresponding extracted IP message over the wireless link connection.

4. The apparatus of claim 2 wherein the wireless modem is further configured to:
  receive an IP message over the wireless link connection;
  encapsulate the IP message; and
  forward a corresponding encapsulated IP message over the wireline broadcast medium.

5. The apparatus of claim 1 further comprising a terminal equipment unit, coupled to the wireline broadcast medium, and configured to send the address request message.

6. The apparatus of claim 1 further comprising a plurality of terminal equipment units, coupled to the wireline broadcast medium, and configured to send the address request message.

7. The apparatus of claim 1 wherein the wireline broadcast medium is Ethernet.

8. The apparatus as claimed in claim 1 wherein the network local server stores a set of one or more permanently assignable IP addresses.

9. The apparatus as claimed in claim 8 wherein the set of one or more permanently assignable IP addresses comprises at least one unroutable address.

10. A method of assigning Internet Protocol (IP) addresses, the method comprising the steps of:
  a) sending an address request message to a network remote server over a wireless link using a point to point protocol;
  b) receiving an assignable IP address from the network remote server in response to the address request message over the wireless link;
  c) receiving a request for an IP address from a terminal equipment unit over a wireline broadcast medium; and
  d) locally generating a responsive IP address assignment message comprising the assignable IP address for transmission to the terminal equipment unit over the wireline broadcast medium.

11. The method of claim 10 wherein the wireline broadcast medium is Ethernet.

12. The method of claim 10 further comprising the steps of:
  a) receiving an encapsulated IP message over the wireline broadcast medium;
  b) extracting the encapsulated IP message; and
  c) forwarding a corresponding extracted IP message over the wireless link to a network unit.

13. The method of claim 10 further comprising the steps of:
  a) receiving an IP message over the wireless link;
  b) encapsulating the IP message; and
  c) forwarding a corresponding encapsulated IP message over the wireline broadcast medium to the terminal equipment unit.

14. The method as claimed in claim 10 wherein said locally generating a responsive IP address assignment message comprises a locally stored IP address for transmission to the terminal equipment unit over the wireline broadcast medium.

15. The method as claimed in claim 14 further comprising:
  providing the assignable IP address to a wireless modem.

16. A method of assigning Internet Protocol (IP) addresses in a wireless communication system comprising the steps of:
  receiving a request for an IP address from a standard terminal equipment unit over a wireline broadcast medium;
  generating a responsive IP address assignment message at a local server associated with the wireline broadcast medium, the responsive IP address assignment message comprising an assignable IP address;
  receiving an encapsulated IP message over the wireline broadcast medium from the standard terminal equipment unit;
  extracting the encapsulated IP message; and
  forwarding a corresponding extracted IP message over a wireless link to a network unit.

17. The method of claim 16 wherein the wireline broadcast medium is Ethernet.

18. The method of claim 16 further comprising the steps of:
  a) receiving an IP message over the wireless link;
  b) encapsulating the IP message; and
  c) forwarding a corresponding encapsulated IP message over the wireline broadcast medium.

19. A wireless modem comprising:
  means for sending an address request message to a network remote server over a wireless link using a point to point protocol;
  means for receiving, over the wireless link, an assignable Internet Protocol (IP) address from the network remote server in response to the address request message;
  means for receiving a request for an IP address from a terminal equipment unit over a wireline broadcast medium; and
  means for generating a responsive IP address for transmission to the terminal equipment unit over the wireline broadcast medium.

20. The apparatus of claim 19 wherein the wireline broadcast medium is Ethernet.

21. The apparatus of claim 19 further comprising:
  a) means for receiving an encapsulated IP message over the wireline broadcast medium;
  b) means for extracting the encapsulated IP message; and
  c) means for forwarding a corresponding extracted IP message over the wireless link to a network unit.

22. The apparatus of claim 19 further comprising:
  a) means for receiving an IP message over the wireless link;
  b) means for encapsulating the IP message; and
  c) means for forwarding a corresponding encapsulated IP message over the wireline broadcast medium to the terminal equipment unit.

23. The apparatus as claimed in claim 19 wherein said means for generating a responsive IP address assignment message comprises:
  means for generating a responsive IP address assignment message comprising a locally stored IP address for transmission to the terminal equipment unit over the wireline broadcast medium.

24. Apparatus for assigning Internet Protocol (IP) addresses, the apparatus comprising:
  a) a local server configured to:
    i) send an address request message to a remote network server over a wireless link; and
    ii) receive an assignable IP address from the remote network server in response to the address request message; and
  b) a processor configured to:
    i) receive a request for an IP address from a terminal equipment unit over a wireline broadcast medium; and ii) generate a responsive IP address assignment message comprising the assignable IP address for transmission to the terminal equipment unit over the wireline broadcast medium.

25. The apparatus of claim 24 wherein the wireline broadcast medium is Ethernet.

26. The apparatus of claim 24 wherein the processor is further configured to:
   a) receive an encapsulated IP message over the wireline broadcast medium;
   b) extract the encapsulated IP message; and
   c) forward a corresponding extracted IP message over the wireless link to a network unit.

27. The apparatus of claim 24 wherein the processor is further configured to:
   a) receive an IP message over the wireless link;
   b) encapsulate the IP message; and
   c) forward a corresponding encapsulated IP message over the wireline broadcast medium to the terminal equipment unit.

28. The apparatus as claimed in claim 24 wherein said processor further configured to generate a responsive IP address assignment message comprising a locally stored IP address for transmission to the terminal equipment unit over the wireline broadcast medium.

29. A system comprising:
   a network infrastructure configured to assign a plurality of IP addresses;
   a wireless link connection coupled with the network infrastructure;
   a wireline broadcast medium;
   a wireless modem, coupled with the wireless link connection and the wireline broadcast medium; and
   a local server, coupled with the wireless modem; wherein,
      the wireless modem sends, over the wireless link connection to the network infrastructure, a request for the plurality of IP addresses,
      the network remote server sends, over the wireless link connection to the wireless modem, the plurality of IP addresses;
      the local server stores the plurality of IP addresses.

30. The system of claim 29 further comprising:
   a terminal equipment unit connected to the wireline broadcast medium; wherein,
      the terminal equipment unit sends, over the wireline broadcast medium, a request for an IP address;
      the wireless modem passes the request for an IP address to the local server;
      the local server assigns a one of the stored plurality of IP addresses to the terminal equipment unit;
      the wireless modem sends, over the wireline broadcast medium, the assigned one of the stored plurality of IP addresses to the terminal equipment unit.

* * * * *

UNITED STATES PATENT AND TRADEMARK OFFICE
CERTIFICATE OF CORRECTION

PATENT NO.    : 6,535,918 B1
DATED         : March 18, 2003
INVENTOR(S)   : Paul E. Bender et al.

It is certified that error appears in the above-identified patent and that said Letters Patent is hereby corrected as shown below:

<u>Title page,</u>
Item [75], please add the last named inventor, -- Gadi Karmi, San Diego, CA --

Signed and Sealed this

Thirteenth Day of April, 2004

JON W. DUDAS
*Acting Director of the United States Patent and Trademark Office*